United States Patent [19]

Conroy et al.

[11] 4,160,812
[45] Jul. 10, 1979

[54] MULTI-STAGE CRYSTALLIZATION OF SODIUM CARBONATE

[75] Inventors: Edward H. Conroy, Green River, Wyo.; Arthur Gloster, New York, N.Y.

[73] Assignee: Texasgulf Inc., Stamford, Conn.

[21] Appl. No.: 835,003

[22] Filed: Sep. 20, 1977

[51] Int. Cl.$^2$ .......................... B01D 1/26; C01D 7/00
[52] U.S. Cl. .................. 423/421; 423/206 T; 23/302 T; 159/17 P
[58] Field of Search .............. 423/179, 184, 206 T, 423/421, 427, 428; 23/298, 300, 302 T, 273 R, 274; 159/17 P, 20 R; 203/12, 78, 82

[56] References Cited

U.S. PATENT DOCUMENTS

| | | | |
|---|---|---|---|
| 1,216,187 | 2/1917 | Trump | 23/298 |
| 3,264,057 | 8/1966 | Miller | 423/206 T |
| 3,653,848 | 4/1972 | Port et al. | 423/206 T |
| 3,705,790 | 12/1972 | Garofano et al. | 423/206 T |
| 3,712,797 | 1/1973 | Winkler | 23/298 |

Primary Examiner—O. R. Vertiz
Assistant Examiner—Gary P. Straub
Attorney, Agent, or Firm—Kenyon & Kenyon

[57] ABSTRACT

Sodium carbonate is crystallized in multi-stage evaporative crystallizers from a pregnant liquor process solution typically obtained by dissolving calcined crude trona in water, separating insoluble impurities, and removing the majority of organic matter with activated carbon. After separation from the sodium carbonate crystals, a portion of the mother liquor usually is recycled to the crystallizers, and the remainder is purged to prevent buildup of impurities. Product quality is improved, and the amount of purged mother liquor is reduced by feeding the pregnant liquor predominantly to the initial stage crystallizers, directing the majority of the recycled mother liquor to a final stage crystallizer, recovering sodium carbonate crystals from slurries from at least the initial stages, and withdrawing purge liquor only from the slurry from the final stage crystallizer. Automatic compensation for variations in feed rates is obtained by introducing fresh feed into one end of a common crystallizer feed pipe adjacent to the first stage and directing recycled mother liquor to the other end of the feed pipe adjacent to the final stage. Preferably the stages are arranged in order of decreasing temperature so that the purge liquor is taken from the lowest temperature stage.

14 Claims, 1 Drawing Figure

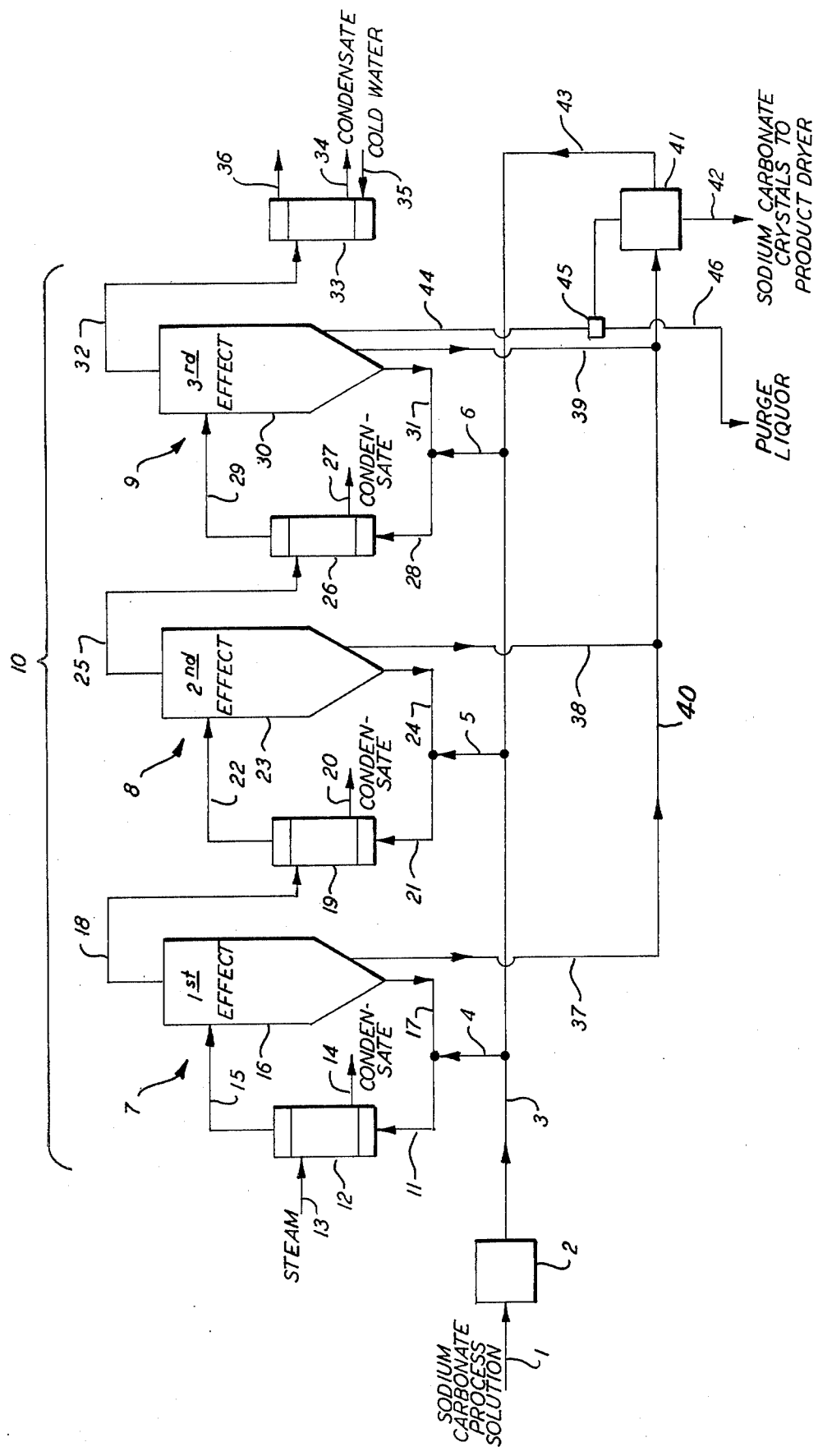

MULTI-STAGE CRYSTALLIZATION OF SODIUM CARBONATE

BACKGROUND OF THE INVENTION

1. Field of the Invention

This invention relates to the production of sodium carbonate (soda ash) from trona, and particularly to an improved process for crystallizing sodium carbonate in multiple-effect crystallizers.

2. Description of the Prior Art

Trona, as mined in the area of Green River, Wyoming, contains about 90 to 95 percent sodium sesquicarbonate ($Na_2CO_3 \cdot NaHCO_3 \cdot 2H_2O$). The remaining 5 to 10 percent consists mainly of insoluble components (principally shale) plus sodium chloride (NaCl), sodium sulfate ($Na_2SO_4$), and small quantities of organic matter.

In a common method of obtaining marketable soda ash from this trona ore, the crude trona is first heated to approximately 150°–200° C. to decompose the bicarbonate portion of the sesquicarbonate into sodium carbonate and carbon dioxide. The resulting crude soda ash is mixed with enough water in a dissolver to produce a substantially saturated solution having about 30 percent $Na_2CO_3$ by weight. The solution is separated from the insoluble impurities, treated with activated carbon to remove a majority of the organic matter, and then usually filtered to yield a purified clear pregnant liquor, yet which still contains some organic matter plus dissolved NaCl and $Na_2SO_4$.

The pregnant liquor is then fed into multiple effect evaporative crystallizers (usually three-stage) in which water is evaporated and crystals of sodium carbonate monohydrate ($Na_2CO_3 \cdot H_2O$) are formed. The crystals are separated from the mother liquor, dried in a product drier, screened for dust removal, and then stored for shipment as final product. Because the mother liquor may contain as much as 30 percent of the sodium carbonate in the original pregnant liquor feed, it is normally recycled to the crystallizers for further treatment.

The basic process outlined above, also known as the monohydrate process, is disclosed in U.S. Pat No. 2,962,348, issued to L. Seglin et al. on Nov. 29, 1960. U.S. Pat. No. 3,933,977, issued to J. M. Ilardi et al. on Jan. 20, 1976, provides additional detailed description of equipment and procedures for preparing a pregnant liquor carbonate process solution, and the disclosures of both these patents are incorporated here by reference.

Although recycling the mother liquor greatly improves the yield of sodium carbonate crystals, the concentrations of residual organic matter which passes through the carbon treaters and soluble impurities such as NaCl and $Na_2SO_4$ tend to build up in the crystallizers. If the organic matter buildup gets too high, it can cause foaming in the crystallizers, and the sodium carbonate crystals will be discolored and have undesirably low bulk density. Excessive concentrations of NaCl and $Na_2SO_4$ will result in complex salts which may crystallize out with the sodium carbonate to cause off-specification product. The foaming effect can be offset to some extent by adding defoaming compounds, but the adverse effects on the crystalline product can be prevented only by keeping the concentration of these impurities at a relatively low level.

One solution to this problem is to recycle only a portion of the mother liquor and purge the rest. The previously mentioned Seglin et al. U.S. Pat No. 2,962,348, for example, teaches purging enough mother liquor from the recycling line to operate at a concentration of about 5% combined NaCl and $Na_2SO_4$.

In the Seglin et al. U.S. Pat. No. 2,962,348, as well as in subsequent U.S. Pat. Nos. 3,131,996 and 3,655,331 issued to the same inventors, both the fresh pregnant liquor and the recirculated mother liquor pass in series through the entire crystallizer, whether it is single stage or multi-stage, although the U.S. Pat. Nos. 3,131,996 and 3,655,331 suggest alternatively that the mother liquor can be returned to the third stage of a triple-effect evaporator crystallizer, if desired.

U.S. Pat. No. 3,653,848, issued to E. B. Port et al. on Apr. 4, 1972, proposes another method to prevent buildup of impurities, particularly organic matter, in a recycling crystallization process. In the Port et al. process, fresh pregnant liquor is delivered only to the second and third effects of a triple-effect evaporator crystallizer. Mother liquor, separated from a "first crop" of sodium carbonate crystals taken from these crystallizers, is recycled to the highest temperature first effect crystallizer to produce a "second crop" of crystals. A portion of the recycled mother liquor is purged directly from the first effect crystallizer in order to keep the organic impurities level below 5000 ppm, basis sodium carbonate. The remainder of the recycled mother liquor, containing the "second crop" of crystals, is returned to a tank holding a slurry of the "first crop" crystals from the second and third effect crystallizers.

The aforementioned Ilardi et al. U.S. Pat. No. 3,933,977 discloses an alternative process in which a portion of the mother liquor recycled to a monohydrate crystallizer is bled off and directed to a separate anhydrous (higher temperature) crystallizer. A portion of the bled-off mother liquor is purged directly from the anhydrous crystallizer, and an additional amount may be purged after separation from the anhydrous sodium carbonate crystals produced in this latter crystallizer.

Thus, both Ilardi et al. and Port et al. obtain additional sodium carbonate product from at least a portion of the recycled mother liquor before it is purged. The Ilardi et al. process requires a separate high temperature crystallizer. The Port et al. system, on the other hand, uses one stage (the hottest stage) of a triple-effect evaporator crystallizer for segregating all of the recycled mother liquor from the other two stages. This arrangement demands careful control, however, to maintain a balance between fresh pregnant liquor feed and mother liquor recycle rates proportional to the capacities of the respective crystallizer stages.

SUMMARY OF THE INVENTION

It is an object of the present invention to provide an improved recycling crystallization process for obtaining sodium carbonate from a clarified pregnant liquor infeed. A more specific object is to provide a crystallization process for sodium carbonate that will produce improved yield and a correspondingly reduced amount of purge liquor with only minor rearrangement of conventional apparatus. A further object is to provide such a process that will compensate automatically for variations in mother liquor recycle rate relative to fresh pregnant liquor feed rate.

These and other objects are achieved by the process of the present invention, which includes feeding a pregnant liquor comprising an approximately saturated sodium carbonate process solution to a multiple-effect evaporative crystallizer having stages arranged preferably in order of decreasing temperature, such that the majority of the process solution is fed to at least one stage ahead of the final stage. After crystallization occurs, a slurry of sodium carbonate crystals in mother liquor is drawn from at least one and preferably all stages of the crystallizer, the sodium carbonate crystals in the slurry are separated from the mother liquor, and the mother liquor is recycled to the crystallizer, with a majority of the recycled mother liquor being directed to the final stage. Purge liquor is withdrawn only from the slurry formed in the final stage of the crystallizer, i.e., from the stage having the major part of the mother liquor.

The initial stages of the crystallizer have the highest proportion of fresh process solution and hence produce crystals from the purest solution. On the other hand, the recycled mother liquor has a higher concentration of impurities than the fresh feed because very little of the impurities are lost in the evaporated portion of the feed solution. By withdrawing purge liquor from the stage having the highest concentration of impurities, the process permits operation with a higher concentration of impurities in the final stage, for a given overall crystal quality, than would be possible if the mother liquor were recycled in the same direction as the incoming feed. This results in a lower rate of purge, and less product is lost because of this purge.

Thus, the process of the present invention provides the advantage of purging from a relatively segregated recycle stream. Although the process of U.S. Pat. No. 3,653,848 of Port et al. purges from a segregated recycle stream, the present process yields the additional benefit of improved heat economy, because the discarded purge liquor comes preferably from the lowest temperature stage of the crystallizer rather than from the highest temperature stage, as in the Port et al. process.

In the disclosed preferred embodiment, the present invention also incorporates a very important further advantage, that of automatically compensating for variations in the flow rate of incoming fresh sodium carbonate process solution relative to the flow of recycled mother liquor.

This preferred process for preparing sodium carbonate crystals comprises feeding a substantially saturated sodium carbonate process solution into one end and recycling mother liquor into the other end, respectively, of a common feed pipe extending alongside the successive stages of a multiple-effect crystallizer. The one end of the feed pipe preferably is adjacent to the highest temperature effect of the crystallizer, and the other end is adjacent to the lowest temperature effect of the crystallizer. Branch lines, spaced along the feed pipe from the one end to the other end, connect the feed pipe to successive stages of the crystallizer.

This preferred arrangement assures that the majority of the fresh process solution feeds to the higher temperature stages, with the largest share going to the first stage. Conversely, the majority of the recycled mother liquor is directed into the last stage of the crystallizer. The result is that, in a typical triple-effect crystallizer, the first stage has the purest solution, the second stage has the next purest solution, and the third stage has the most impure solution. In this way, the crystals from the first two stages will be purer than those from the third stage, and the aveage batch of crystals from all three stages will be purer than if the same level of impurity were to be carried in all three stages.

At the same time, because each of the flow streams (incoming fresh pregnant liquor and recycled mother liquor) have access to all the stages through the common feed pipe, the arrangement provides automatic compensation for temporary fluctuations in the relative feed rates of the two streams.

As mentioned previously, all of the purge liquor is withdrawn from the final stage, which has the highest concentration of impurities. Because liquor drawn from the crystallizer, even from near the top, contains recoverable sodium carbonate crystals, it is not economic to purge directly from the final stage. The preferred procedure is to drain a slurry from the final stage, pass the slurry through a preliminary separator, and then deliver the crystals to the main separator that receives the slurries from the other stages. The substantially crystal-free liquor from the preliminary separator, which may be a hydroclone, is then purged.

The above and other features of the invention will be further described in connection with the FIGURE, that illustrates the preferred embodiment of the process.

BRIEF DESCRIPTION OF THE DRAWING

The FIGURE is a schematic flowsheet of the preferred embodiment of the crystallization process of the invention.

DESCRIPTION OF THE PREFERRED EMBODIMENT

Referring to the drawing, purified pregnant sodium carbonate process solution is delivered through pipeline 1 to a container 2. The sodium carbonate process solution is prepared from trona by known processes, such as those described in U.S. Pat Nos. 2,962,348 and 3,933,977 discussed earlier. The solution obtained from such processes is substantially saturated with sodium carbonate plus small amounts of NaCl and $Na_2SO_4$. In addition, there is usually residual organic matter, up to about 5000 ppm on a basis of sodium carbonate, that was not removed by the treatment with activated carbon.

Process solution from container 2 flows into one end of a common feed pipe or header 3 and is distributed through branch lines 4, 5 and 6 to stages 7, 8, and 9, respectively, which comprise the respective first, second, and third stages of a triple-effect evaporator crystallizer 10.

The one end of common header 3 is adjacent to first stage 7; so that the largest share of the fresh pregnant liquor feed will enter that stage through branch 4 and line 11 into the tube-side inlet of a heat exchanger 12. Steam from a boiler (not shown) is supplied to the shell side of exchanger 12 through line 13 and leaves as condensate through line 14 after evaporating water from the process solution, which circulates through line 15 to a first effect evaporator 16 and thence through lines 17 and 11 back to the heat exchanger.

The water evaporated from the circulating process solution passes as steam from the top of the first effect evaporator through line 18 to the shell side inlet of second stage heat exchanger 19. There it is condensed and discharged through line 20. The heat of condensation of the first stage evaporant is used to preheat additional process solution supplied through branch line 5 and inlet line 21. The preheated solution then flows through line 22 to second effect evaporator 23, where a portion of the water is evaporated. The remainder of the solution recirculates to the heat exchanger through line 24.

The water evaporated in the second effect passes as steam through line 25 to third stage heat exchanger 26.

As in the previous two stages, this evaporant is condensed and discharges through line 27 while heating sodium carbonate solution that circulates from heat exchanger inlet line 28, through the tube side of heat exchanger 26, line 29 from the heat exchanger to third effect evaporator 30, and then back through return line 31. The water evaporated in the third and final effect then passes through line 32 to a water-cooled condenser 33, from which it is discharged as condensate through line 34. Cooling water for the condenser enters through line 35 and leaves through line 36.

From the foregoing, it is apparent that the steam entering through line 13 supplies the energy to operate all three stages, with each stage recovering the heat from the evaporant of the preceding stage, and operating at a progressively lower temperature and pressure. Condenser 33, together with ancillary devices such as steam ejectors (not shown) for removing non-condensable gases, produces the vacuum which lowers the boiling points in the second and third effects.

Typical operating temperatures for the three stages are approximately 100° C. in the first effect, 75° C. in the second effect, and 50° C. in the final effect. These temperatures will produce sodium carbonate monohydrate crystals in each effect. A slurry of crystals is withdrawn from each of the first, second and third effects through pipelines 37, 38, and 39, respectively. These lines connect to a common header 40, which delivers the slurries from all three effects to a separator 41. The separator may be a filter, centrifuge, or other known apparatus for removing the crystals from the mother liquor.

From the separator, the crystals proceed through a chute or conveyor 42 to a product dryer (not shown) for processing into final product for shipment. The mother liquor is recycled through pipeline 43 to the other end of common feed header 3, which is adjacent to the final (third) stage of the crystallizer.

Connecting the mother liquor recycle to the end of the common feed header opposite to the fresh process solution infeed results in most of the mother liquor being directed through branch line 6 to the final stage of the crystallizer. Any excess of mother liquor, beyond what the final stage will accept, flows in the reverse direction through common header 3 into the second stage through branch line 5, comingling with the fresh pregnant liquor being fed to that stage. Conversely, if there is insufficient recycled mother liquor to satisfy the demand of the final stage, any excess requirement will be made up by fresh pregnant liquor flowing forward through header 3 to branch line 6.

In this way the process continuously and automatically adjusts the distribution of fresh process solution infeed and recycled mother liquor, depending on the ratio of pregnant feed to the mother liquor recycle stream and the relative evaporative rates in the three crystallizer effects, while substantially segregating the recycle stream, with its higher concentration of impurities, in the final stage of the crystallizer.

From this final stage, a purge stream is withdrawn through line 44. This stream, which contains sodium carbonate crystals in a liquor having the highest concentration of impurities in the crystallizer system, flows to an auxiliary separating device 45. Device 45 is preferably a hydroclone, in which the crystals are separated from the carrying liquid by centrifugal force. The separated crystals are then delivered to the main separator 41, while the purge liquor is discharged through waste line 46.

For simplicity, the foregoing description and schematic diagram of the preferred embodiment of the process of the present invention has omitted various elements, such as pumps and valves, that would be necessary in an actual operating plant. Such elements are not part of the present invention and can be readily supplied as needed by one familiar with prior art crystallization processes.

Although the preferred embodiment of the process of the present invention directs fresh pregnant liquor and recycled mother liquor into opposite ends of a feed header extending adjacent to stages of a crystallizer arranged in order of descending temperature, the principle of opposed feed and recycle flows to a common header is equally applicable to crystallizer stages arranged in any order.

We claim:

1. A process for preparing sodium carbonate crystals comprising:
   feeding a substantially saturated sodium carbonate process solution to a multiple-effect evaporative crystallizer having at least three stages including a highest temperature first stage and a lowest temperature final stage, the process solution being directed in parallel to at least the first two stages and with the majority of the process solution being fed to at least one stage ahead of the final stage;
   drawing a slurry of sodium carbonate crystals in mother liquor from at least one stage of the crystallizer ahead of the final stage;
   separating the sodium carbonate crystals in the drawn slurry from the mother liquor;
   recycling the mother liquor to the crystallizer, the mother liquor being directed in parallel to at least the final two stages and with the majority of the recycled mother liquor being delivered to the final stage; and
   withdrawing purge liquor only from the final stage of the crystallizer.

2. A process according to claim 1 wherein the step of drawing a slurry of sodium carbonate crystals in mother liquor from at least one stage of the crystallizer ahead of the final stage comprises drawing the slurry from at least the first stage of the crystallizer.

3. A process according to claim 1 wherein the step of drawing a slurry of sodium carbonate crystals in mother liquor from at least one stage of the crystallizer comprises drawing the slurry from all stages of the crystallizer ahead of the final stage.

4. A process according to claim 3 comprising combining the slurries drawn from each stage of the crystallizer ahead of the final stage with a slurry of carbonate crystals drawn from the final stage prior to separating the crystals from the mother liquor.

5. A process according to claim 1 wherein the step of withdrawing purge liquor comprises drawing a purge stream slurry of sodium carbonate crystals from the final stage of the crystallizer; removing the crystals from the purge stream drawn from the final stage; and purging the remaining substantially crystal-free liquor.

6. A process according to claim 5 comprising adding the sodium carbonate crystals removed from the purge stream slurry from the final stage to the slurry drawn from the at least one stage ahead of the final stage.

7. A process according to claim 1 wherein the step of feeding the sodium carbonate process solution to the crystallizer comprises directing the process solution into a single feed pipe that extends alongside the separate stages of the multiple-effect crystallizer and has successive branch pipes extending to each stage, the process solution entering the feed pipe adjacent to the first stage.

8. A process according to claim 1 wherein the step of recycling the mother liquor to the crystallizer comprises directing the recycled mother liquor into a single recycle pipe that extends alongside the separate stages of the multiple-effect crystallizer and has successive branch pipes extending to each stage of the crystallizer, the recycled mother liquor entering the feed pipe adjacent to the final stage.

9. A process for preparing sodium carbonate crystals comprising:
feeding a substantially saturated sodium carbonate process solution into one end of a common feed pipe extending alongside a multiple-effect evaporator crystallizer having at least three stages including a first stage and a final stage arranged in order of decreasing temperature, said one end of the common feed pipe being adjacent to the first stage and another end of the feed pipe being adjacent to the final stage, and the feed pipe having branch lines spaced between the one end and the other end and connected to the respective stages of the crystallizer;
drawing a slurry of sodium carbonate crystals in mother liquor from at least each stage of the crystallizer ahead of the final stage;
combining the drawn slurries;
separating the sodium carbonate crystals in the combined slurries from the mother liquor;
recycling the mother liquor into the other end of the common feed pipe; and
withdrawing a purge stream only from the final stage of the crystallizer.

10. A process according to claim 9 comprising
drawing a slurry of sodium carbonate crystals from the final stage and
combining the slurry drawn from the final stage with the slurries drawn from each stage ahead of the final stage prior to separating the sodium carbonate crystals from the mother liquor.

11. A process for preparing sodium carbonate crystals comprising:
feeding a substantially saturated sodium carbonate process solution into one end of a common feed pipe extending alongside a multiple-effect evaporator crystallizer having at least a first stage and a final stage arranged in order of decreasing temperature, said one end of the common feed pipe being adjacent to the first stage and another end of the feed pipe being adjacent to the final stage, and the feed pipe having branch lines spaced between the one end and the other end and connected to the respective stages of the crystallizer;
drawing a slurry of sodium carbonate crystals in mother liquor from at least each stage of the crystallizer ahead of the final stage;
combining the drawn slurries;
separating the sodium carbonate crystals in the combined slurries from the mother liquor;
recycling the mother liquor into the other end of the common feed pipe; and
withdrawing a purge stream only from the final stage of the crystallizer, wherein the purge stream contains sodium carbonate crystals in a mother liquor having a higher concentration of impurities than in the preceding stages;
separating the sodium carbonate crystals from the impure mother liquor in the purge stream;
adding the crystals separated from the purge stream to the crystals drawn from the other stages of the crystallizer; and
purging the impure mother liquor.

12. A process for preparing sodium carbonate crystals comprising:
feeding a substantially saturated sodium carbonate process solution into one end of a common feed pipe extending alongside a triple-effect evaporator crystallizer having first, second, and final stages arranged in order of decreasing temperature, said one end of the common feed pipe being adjacent to the first stage and another end of the feed pipe being adjacent to the final stage, and the feed pipe having branch lines spaced between the one end and the other end and connected to the respective stages of the crystallizer, so that a majority of the sodium carbonate process solution is fed to the first and second stages;
drawing a slurry stream of sodium carbonate crystals in mother liquor from each stage of the crystallizer;
combining the drawn slurry streams;
separating the sodium carbonate crystals in the combined slurry from the mother liquor;
recycling the mother liquor into the other end of the common feed pipe, so that the majority of recycled mother liquor is directed into the final stage of the crystallizer;
withdrawing a purge stream only from the final stage of the crystallizer, the purge stream containing sodium carbonate crystals in a mother liquor having a higher concentration of impurities than in the first and second stages;
separating the sodium carbonate crystals from the impure mother liquor in the purge stream,
adding the crystals separated from the purge stream to the drawn slurry stream prior to crystal separation from the combined slurry; and
purging the separated impure mother liquor.

13. A process for preparing sodium carbonate crystals comprising:
feeding a substantially saturated sodium carbonate process solution into one end of a two-ended common feed pipe extending alongside a multiple-effect evaporator crystallizer having at least three stages including a first stage and a final stage, said one end of the common feed pipe being adjacent to one of the stages of the crystallizer, and the other end of the feed pipe being adjacent to another stage of the crystallizer, and the feed pipe having branch lines equal to the number of stages spaced between the one end and the other end and each branch line being connected to a different one of the stages of the crystallizer;
drawing a slurry of sodium carbonate crystals in mother liquor from each stage of the crystallizer;
combining the drawn slurries;
separating the sodium carbonate crystals in the combined slurries from the mother liquor;
recycling the mother liquor into the other end of the common feed pipe; and
withdrawing a purge stream from only one stage of the crystallizer having the highest concentration of impurities.

14. A process according to claim 11 comprising
drawing a slurry of sodium carbonate crystals from the final stage and
combining a slurry drawn from the final stage with the slurries drawn from each stage ahead of the final stage prior to separating the sodium carbonate crystals from the mother liquor.

* * * * *